(12) United States Patent
Matsuoka et al.

(10) Patent No.: US 10,252,184 B2
(45) Date of Patent: Apr. 9, 2019

(54) EXTRACTION METHOD (71) Applicant: Kobe Steel, Ltd., Kobe-shi (JP)

(72) Inventors: Akira Matsuoka, Kobe (JP); Koji Noishiki, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 68 days.

(21) Appl. No.: 15/325,850

(22) PCT Filed: Jun. 25, 2015

(86) PCT No.: PCT/JP2015/068412
§ 371 (c)(1),
(2) Date: Jan. 12, 2017

(87) PCT Pub. No.: WO2016/009810
PCT Pub. Date: Jan. 21, 2016

(65) Prior Publication Data
US 2017/0157531 A1  Jun. 8, 2017

(30) Foreign Application Priority Data

Jul. 14, 2014  (JP) ................................. 2014-144033

(51) Int. Cl.
*B01D 11/04*  (2006.01)
*B01J 19/00*  (2006.01)

(52) U.S. Cl.
CPC .......... *B01D 11/0496* (2013.01); *B01D 11/04* (2013.01); *B01D 11/0453* (2013.01);
(Continued)

(58) Field of Classification Search
None
See application file for complete search history.

(56) References Cited

U.S. PATENT DOCUMENTS 4,268,484 A * 5/1981 Gavin .................... B01D 11/04
422/259
2008/0226541 A1   9/2008 Zhou et al.
(Continued)

FOREIGN PATENT DOCUMENTS

JP    62-96700 A    5/1987
JP    11-323453 A   11/1999
(Continued)

OTHER PUBLICATIONS

JPS6296700 Machine Translation—Eto, Yoshihiro et al (Year: 1987).*
(Continued)

*Primary Examiner* — Krishnan S Menon
*Assistant Examiner* — Bradley R Spies
(74) *Attorney, Agent, or Firm* — Oblon, McClelland, Maier & Neustadt, L.L.P.

(57) ABSTRACT

An extracting method includes: an extracting step of extracting a specific component from a material fluid to an extraction agent while allowing the material fluid and the extraction agent to flow in a channel of the extraction unit for each stage; an outflowing step of outflowing a mixture fluid from the channel of the extraction unit for each stage before the extraction of the specific component reaches an extraction equilibrium; and a pH regulating step of regulating the pH of the material fluid separated in a separating step after flowing out of the channel of the extraction unit for a predetermined stage so as to cause a reverse change from a change caused in the pH of the material fluid in the extracting step, before the material fluid is introduced into the channel of the extraction unit for a stage succeeding to the predetermined stage.

5 Claims, 7 Drawing Sheets

(52) U.S. Cl.
CPC ...... *B01D 11/0484* (2013.01); *B01D 11/0492* (2013.01); *B01J 19/00* (2013.01)

(56) References Cited

U.S. PATENT DOCUMENTS

| | | |
|---|---|---|
| 2012/0234755 A1 | 9/2012 | Noishiki et al. |
| 2013/0118588 A1 | 5/2013 | Noishiki et al. |
| 2015/0239738 A1 | 8/2015 | Zhou et al. |

FOREIGN PATENT DOCUMENTS

| | | |
|---|---|---|
| JP | 2010-229455 A | 10/2010 |
| JP | 2012-196599 A | 10/2012 |
| JP | 2013-126616 A | 6/2013 |
| JP | 2013-181247 A | 9/2013 |
| WO | WO 2008/112999 A1 | 9/2008 |

OTHER PUBLICATIONS

English translation of the International Preliminary Report on Patentability and Written Opinion dated Jan. 26, 2017 in PCT/JP2015/068412.

International Search Report dated Aug. 18, 2015 in PCT/JP2015/068412 filed Jun. 25, 2015.

\* cited by examiner

EXTRACTION METHOD

TECHNICAL FIELD

The present invention relates to an extracting method.

BACKGROUND ART

Conventionally, various extracting methods for extracting a specific component from a material fluid have been known. One of the extracting methods is exemplified in Patent Literature 1.

In an extracting method disclosed in Patent Literature 1, mixer-settler units provided for a plurality of stages are used to extract neodymium and praseodymium as specific components from a nitric acid-based mixed solution containing the neodymium and the praseodymium as a material fluid to a quaternary amine solution as an extraction agent.

The mixer-settler unit for each stage includes a mixer part, a settler part, and a transfer part. In the mixer part, the introduced nitric acid-based mixed solution and quaternary amine solution are mixed with each other. The mixer part includes an agitator for agitating the introduced nitric acid-based mixed solution and quaternary amine solution to form an emulsion. The emulsion formed in the mixer part is introduced into the settler part. In the settler part, the introduced emulsion is settled to be separated into an organic phase and an aqueous phase. The transfer part transfers the organic phase having been separated in the settler part to the mixer part of the mixer-settler unit for a succeeding stage, and transfers the aqueous phase having been separated in the settler part to the mixer part of the mixer-settler unit for a preceding stage. The extraction of the neodymium and praseodymium from the nitric acid-based mixed solution to the quaternary amine solution is performed in an agitating step in the settler part and a settling step in the mixer part of the mixer-settler unit for each stage.

Meanwhile, there is a case in which the pH of a material fluid changes in accordance with progress in extraction of a specific component from a material fluid, and consequently an extraction efficiency of the specific component will change due to the change of the pH, depending on a type of extraction reaction. For example, the pH of the material fluid lowers in accordance with the extraction progress, and consequently the extraction efficiency of the specific component of the material fluid will deteriorate due to the lowering in the pH.

In the extracting method using the aforementioned mixer-settler units, some micro particles of the organic phase are dispersed into the aqueous phase due to the agitation in the mixer part. Hence, a considerably long time period is required to settle and separate the aqueous phase containing the dispersed micro particles of the organic phase into the organic phase and the aqueous phase in the settler part. Accordingly, the extraction progress continues until the separation is completed. The pH of the material fluid is high and the extraction progresses at a high extraction speed immediately after the material fluid and the extraction agent are mixed with each other. However, after an elapse of a predetermined time period, the pH of the material fluid lowers in accordance with the extraction progress so that the extraction progress slows down. During a large part of the long time period required to complete the separation in the settler part, the extraction progress is very slow or the extraction reaches and maintains an extraction equilibrium due to the pH of the material fluid that has already lowered. Accordingly, the time efficiency of the extraction process extremely deteriorates in this case.

CITATION LIST

Patent Literature

Patent Literature 1: Japanese Unexamined Patent Publication No. HEI 11-323453

SUMMARY OF INVENTION

The present invention has an object of providing an extracting method which can improve the time efficiency of an extracting process.

An extracting method according to one aspect of the present invention is a method for extracting a specific component from a material fluid to an extraction agent by using an extracting system which includes a plurality of extraction units respectively provided for a plurality of stages, the extraction units each having a channel adapted for extraction and being connected with one another to allow at least a part of the fluid having been flown out from the channel of one of the plurality of the extraction units for any one stage of the plurality of stages to be conveyed to the channel of one of the plurality of the extraction units for a stage succeeding to the any one stage, the extracting method comprising: an extracting step of extracting the specific component from the material fluid to the extraction agent while allowing the material fluid and the extraction agent to flow in the channel of the extraction unit for each of the stages; an outflowing step of outflowing the mixture fluid containing the material fluid and the extraction agent from the channel of the extraction unit for each of the stages before the extraction of the specific component from the material fluid reaches an extraction equilibrium in the channel of the extraction unit for each of the stages; a separating step of separating the mixture fluid having been flown out from the channel of the extraction unit for each of the stages into the material fluid and the extraction agent; a material fluid conveying step of conveying the material fluid having been separated in the separating step after flown out from the channel of one of the plurality of the extraction units for any one stage of the plurality of stages to the channel of one of the extraction units for the stage succeeding to the any one stage; and a pH regulating step of regulating the pH of the material fluid having been separated in the separating step after flown out from the channel of the extraction unit for a predetermined stage so as to cause a reverse change from a change caused in the pH of the material fluid in accordance with the extraction of the specific component in the extracting step, before the material fluid is introduced into the channel of the extraction unit for a stage succeeding to the predetermined stage.

It should be noted that "regulating the pH of the material fluid having been separated in the separating step after flown out from the channel of the extraction unit for a predetermined stage so as to cause a reverse change from a change caused in the pH of the material fluid in accordance with the extraction of the specific component" means not only regulation of restoring the varied pH of the material fluid having been subjected to the extraction of the specific component to the pH which the material fluid had had prior to the extraction, but also regulation of rendering a reverse change in the pH of the material fluid having been subjected to the extraction even if not reaching the pH which the material fluid had had prior to the extraction.

DESCRIPTION OF EMBODIMENTS

Hereinafter, the embodiments of the present invention will be described with reference to the accompanying drawings.

Figure 1:
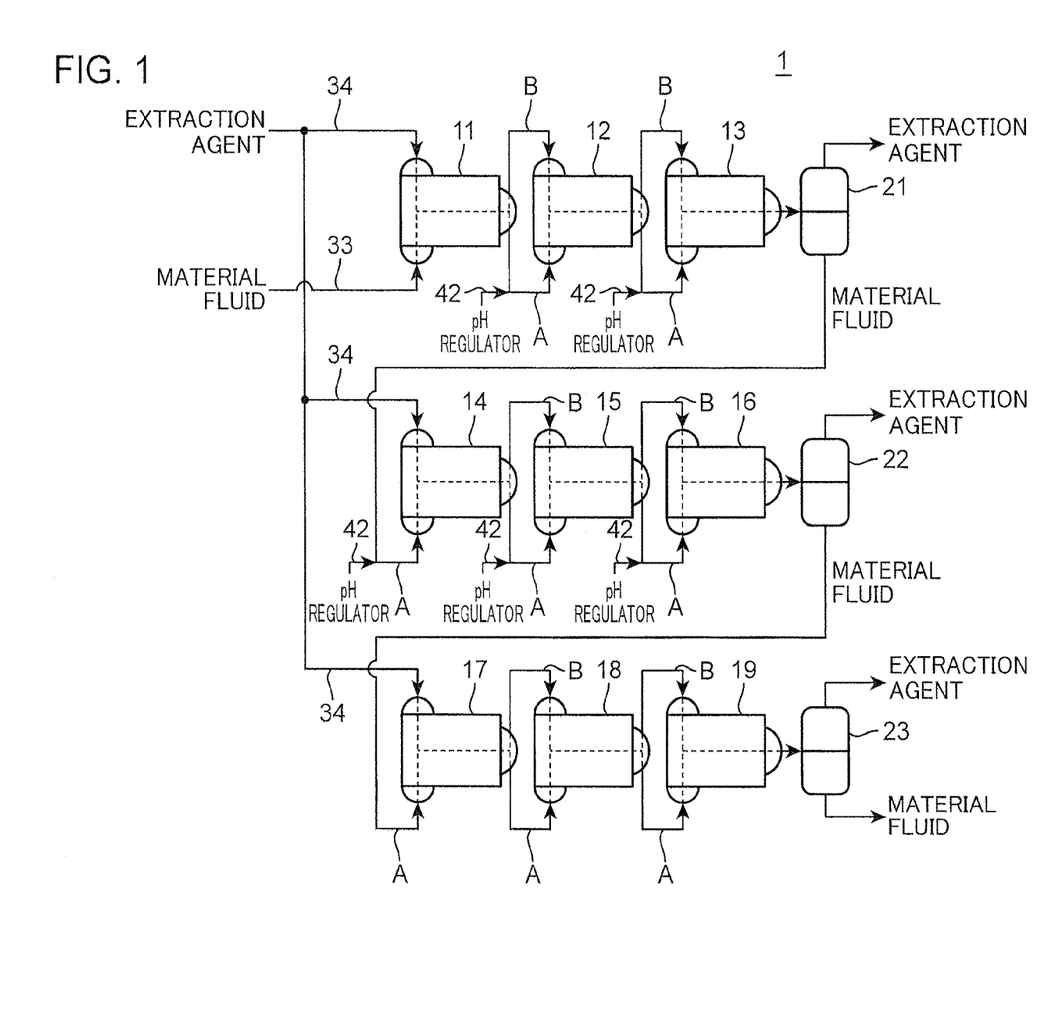
FIG. 1 is a schematic view showing a configuration of an extracting system usable for an extracting method according to a first embodiment of the present invention.

An extracting method according to one embodiment of the present invention includes extracting a specific component which is a target substance to be extracted from a material fluid to an extraction agent by using an extracting system 1 shown in FIG. 1. FIG. 1 is a schematic view which schematically shows the extracting system 1 usable for the extracting method according to the present embodiment.

The extracting system 1 includes, a first extraction unit 11, a second extraction unit 12, a third extraction unit 13, a fourth extraction unit 14, a fifth extraction unit 15, a sixth extraction unit 16, a seventh extraction unit 17, an eight extraction unit 18, a ninth extraction unit 19, a first settler 21, a second settler 22, and a third settler 23.

In each of the first to ninth extraction units 11 to 19, an extracting step of extracting the specific component from the material fluid to the extraction agent is performed. Specifically, each of the first to ninth extraction units 11 to 19 includes a multiple of channels 28 (see FIG. 3) adapted for the extraction. The extraction of the specific component from the material fluid to the extraction agent is performed by allowing the material fluid and the extraction agent being in contact with each other to flow in the channels 28 of the first to ninth extraction units 11 to 19. The first to ninth extraction units 11 to 19 are arranged in this order from an upstream side to a downstream side in the flow direction of the material fluid.

The first extraction unit 11 and the second extraction unit 12 are connected with each other in such a manner as to allow the material fluid having been flown out from the channels 28 of the first extraction unit 11 to be conveyed to the channels 28 of the second extraction unit 12. Further, the first extraction unit 11 and the second extraction unit 12 are connected with each other in such a manner as to allow the extraction agent having been flown out from the channels 28 of the first extraction unit 11 to be conveyed to the channels 28 of the second extraction unit 12. In FIG. 1, tubes indicated at A are connection tubes each conveying the material fluid to the extraction unit for a succeeding stage, and tubes indicated at B are connection tubes each conveying the extraction agent to the extraction unit for the succeeding stage.

The second extraction unit 12 and the third extraction unit 13 are connected with each other in such a manner as to allow the material fluid having been flown out from the channels 28 of the second extraction unit 12 to be conveyed to the channels 28 of the third extraction unit 13. Further, the second extraction unit 12 and the third extraction unit 13 are connected with each other in such a manner as to allow the extraction agent having been flown out from the channels 28 of the second extraction unit 12 to be conveyed to the channels 28 of the third extraction unit 13.

The fourth to the sixth extraction units 14 to 16 are connected with one another in the same manner as the first to third extraction units 11 to 13. Also, the seventh to ninth extraction units 17 to 19 are connected with one another in the same manner as well.

The first settler 21 is connected to the third extraction unit 13 in such a manner as to introduce a mixture fluid of the material fluid and the extraction agent having been flown out from the third extraction unit 13 into the first settler 21. The second settler 22 is connected to the sixth extraction unit 16 in such a manner as to introduce the mixture fluid of the material fluid and the extraction agent having been flown out from the sixth extraction unit 16 into the second settler 22. The third settler 23 is connected to the ninth extraction unit 19 in such a manner as to introduce the mixture fluid of the material fluid and the extraction agent having been flown out from the ninth extraction unit 19 into the third settler 23.

The first to third settlers 21 to 23 settle the introduced mixture fluid, and then separate the mixture fluid into the material fluid and the extraction agent by a specific gravity difference. The first settler 21 is connected to the fourth extraction unit 14 in such a manner as to allow the material fluid having been separated therein to be conveyed to the channel 28 of the fourth extraction unit 14. The extraction agent having been separated in the settler 21 is independently discharged from the settler 21. The second settler 22 is connected to the seventh extraction unit 17 in such a manner as to allow the material fluid having been separated therein to be conveyed to the channel 28 of the seventh extraction unit 17. The extraction agent having been separated in the second settler 22 is independently discharged from the second settler 22. Further, the material fluid and the extraction agent having been separated in the third settler 23 are independently discharged from the third settler 23.

A material supply tube 33 for supplying an unprocessed material fluid is connected to the first extraction unit 11 located at the uppermost stream side among all the extraction units. Furthermore, an extraction supply tube 34 for supplying a new extraction agent unused for the extraction process is connected to each of the first extraction unit 11, the fourth extraction unit 14, and the seventh extraction unit 17.

Moreover, a regulator supply tube 42 for supplying a pH regulator is connected to each of the connection tubes A for conveying the material fluid respectively from the first extraction unit 11 to the second extraction unit 12, from the second extraction unit 12 to the third extraction unit 13, from the first settler 21 to the fourth extraction unit 14, from the fourth extraction unit 14 to the fifth extraction unit 15, and from the fifth extraction unit 15 to the sixth extraction unit 16.

Figure 2:
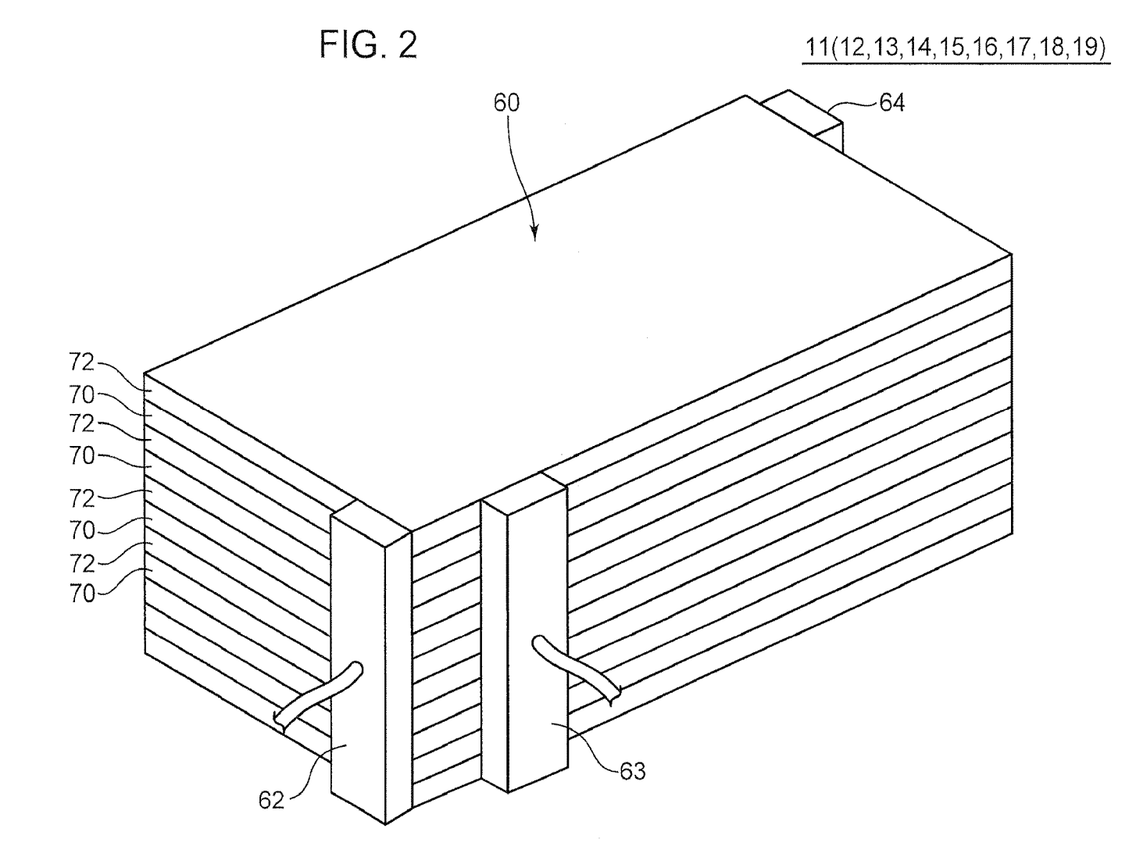
FIG. 2 is a perspective view schematically showing an extraction unit which configures the extracting system.

Next, the specific configuration of each of the extraction units 11 to 19 provided for corresponding stages will be described with reference to FIGS. 2 to 4. As shown in FIG. 2, each of the extraction units 11 to 19 for the stages includes an extraction unit body 60 having a substantially rectangular parallelepiped shape, and a material inflow header 62, an extraction agent inflow header 63 and an outflow header 64 respectively attached to the extraction unit body 60.

The extraction unit body 60 includes the multiple of channels 28 (see FIG. 3) adapted for the extraction of the specific component from the material fluid to the extraction agent by allowing the material fluid and the extraction agent to flow therein. Each of the channels 28 is the so-called microchannel having a very small passage diameter (several μm to several mm). As shown in FIG. 3, the channel 28 includes a material introduction passage 29, an extraction agent introduction passage 30, a joining portion 31, and an extraction passage 32.

The material introduction passage 29 is a part into which the material fluid is introduced. The extraction introduction agent passage 30 is a part into which the extraction agent is introduced. The joining portion 31 is connected to a downstream end of the material introduction passage 29 and a downstream end of the extraction agent introduction passage 30. The joining portion 31 is a part which allows the material fluid having been introduced into the material introduction passage 29 and the extraction agent having been introduced into the extraction agent introduction passage 30 to join each other therein. The extraction passage 32 has an upstream end connected to the joining portion 31, and allows the material fluid and the extraction agent having joined each other in the joining portion 31 to flow therein. The specific component is extracted from the material fluid to the extraction agent in the course in which the material fluid and the extraction agent being in contact with each other flow in the extraction passage 32.

The extraction passage 32 has a passage length along the flow direction of the fluid, the passage length being set to a passage length which is sufficient to allow the material fluid to flow out from a downstream end of the extraction passage 32 before the extraction of the specific component from the material fluid flowing in the extraction passage 32 to the extraction agent reaches an extraction equilibrium. The passage length is set in advance in accordance with conditions of a type, a physical property, a flow rate, and other conditions of the material fluid and the extraction agent to be adopted.

As shown in FIG. 2, the extraction unit body 60 includes a plurality of channel plates 70 and a plurality of sealing plates 72 forming the multiple of channels 28. The extraction unit body 60 is configured by a lamination including the channel plates 70 and the sealing plates 72 alternately placed over one another in the thickness direction thereof and jointed with one another.

The channel plate 70 is exemplified as a channel layer defined in the present invention. The multiple of channels 28 (see FIG. 3) are arrayed along each of the surfaces of the channel plates 70.

Figure 3:
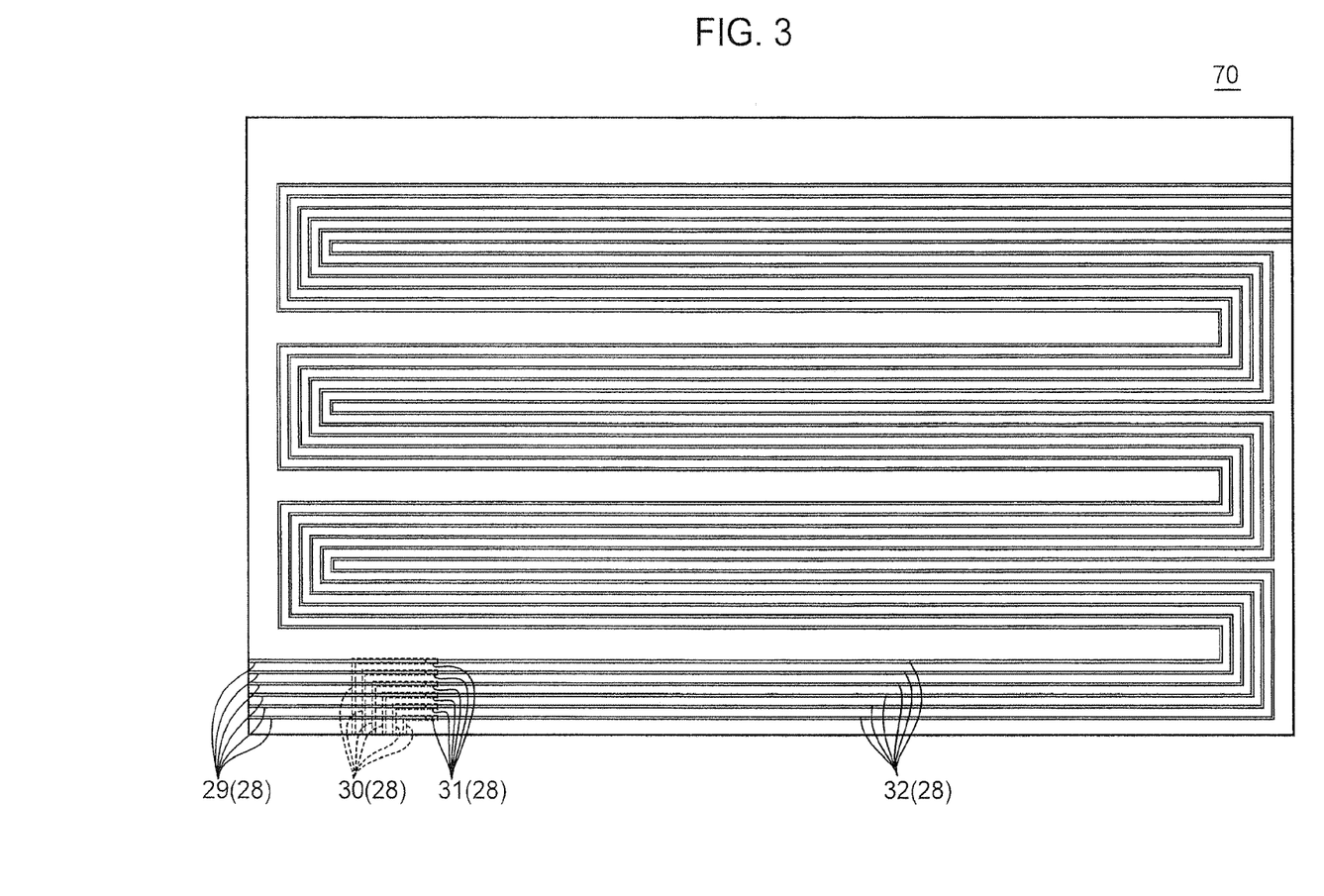
FIG. 3 is a plan view of a channel plate which configures an extraction unit body.

As shown in FIG. 3, one surface of each of the channel plates 70 is formed with grooves each corresponding to the material introduction passage 29 and the extraction passage 32 in each of the channels 28. The apertures of the grooves formed on the one surface of the channel plate 70 are sealed by the sealing plate 72 laminated on the one surface. In this manner, the material introduction passage 29 and the extraction passage 32 are formed.

The other surface of the channel plate 70 is formed with grooves each corresponding to the extraction agent introduction passage 30 in each of the channels 28. The apertures of the grooves formed on the other surface of the passage plate 70 are sealed by the sealing plate 72 laminated on the other surface. In this manner, the extraction agent introduction passage 30 is formed.

Moreover, each of the channel plates 70 has holes extending through the channel plate 70 in the thickness direction thereof at positions where the downstream ends of the material introduction passage 29 and the extraction agent introduction passage 30, and the upstream end of the extraction passage 32 in the channels 28 meet one another. The joining portions 31 of the channels 28 are formed owing to the holes.

The material inflow header 62 (see FIG. 2) is attached to one side surface of the extraction unit body 60 that is formed with openings of the upstream ends of the material introduction passages 29 (FIG. 3) in the channels 28 so as to cover all the openings. The extraction agent inflow header 63 (see FIG. 2) is attached to another side surface of the extraction unit body 60 that is formed with openings of the upstream ends of the extraction agent introduction passages 30 (see FIG. 3) in the channels 28 so as to cover all the openings. The outflow header 64 is attached to further another side surface of the extraction unit body 60 that is formed with openings of the downstream ends of the extraction passages 32 in the channels 28 so as to cover all the openings.

Next, an extracting method using the extracting system 1 according to the present embodiment will be described below.

The extraction method includes supplying an unprocessed material fluid to a first extraction unit 11 through a material supply tube 33 (see FIG. 1), and supplying an extraction agent unused for the extraction process to each of the first extraction unit 11, a fourth extraction unit 14, and a seventh extraction unit 17 through a corresponding extraction agent supply tube 34 (see FIG. 1).

For example, an aqueous solution containing a certain type of metal ion as a specific component which is a target substance to be extracted is adopted as the material fluid. The metal ion is, for example, copper ion, zinc ion, ferrous ion, titanium ion, nickel ion, cobalt ion, manganese ion, vanadium ion, alkaline earth metal ion, alkaline metal ion, or rare earth ion. The rare earth is scandium, yttrium, lanthanum, cerium, praseodymium, neodymium, promethium, samarium, europium, gadolinium, terbium, dysprosium, holmium, erbium, thulium, ytterbium, or lutetium.

For example, a liquid which is PC88A (produced by Daihachi Chemical Industry Co., Ltd.), di-2-ethylhexyl phosphoric acid (D2EHPA), LIX64N, LIX64I, ethylenediaminetetraacetic acid (EDTA), thenoyltrifluoroacetone (TTA), oxine, dithizone, tributyl phosphate, or the like is adopted as the extraction agent. When the liquid has the high viscosity in the original state, the liquid may be diluted by an organic solvent such as kerosene so as to be adoptable as the extraction agent.

The material fluid supplied to the first extraction unit 11 passes through a material inflow header 62 (see FIG. 2) and are dividedly introduced into material introduction passages 29 (see FIG. 3) in respective channels 28 of the first extraction unit 11. The extraction agent supplied to the first extraction unit 11 passes through an extraction agent inflow header 63 (see FIG. 2) and dividedly introduced extraction agent introduction passages 30 (see FIG. 3) in the channels 28 of the first extraction unit 11. In the first extraction unit 11, the material fluid having been introduced into the material introduction passage 29 and the extraction agent having been introduced into the extraction agent introduction passage 30 join each other in a joining portion 31 (see FIG. 3) in each of the channels 28, and flow in a corresponding extraction passage 32. The material fluid and the extraction agent flow in the extraction passage 32 in a state that they are contacted with and easily separable from each other, for example, in the form of a slug flow. Then, the specific component is extracted from the material fluid to the extraction agent in the course in which the material fluid and the extraction agent flow in the extraction passage 38 toward a downstream side.

A mixture fluid of the material fluid and the extraction agent having flown to reach a downstream end (the end of the extraction passage 32 that is opposite to the joining portion 31) of each of the channels 28 of the extraction unit 11 is flown out to an outflow header 64 (see FIG. 2). In the extracting method of the present embodiment, the mixture fluid of the material fluid and the extraction agent is flown out from the channel 28 to the outflow header 64 before the extraction of the specific component from the material fluid reaches an extraction equilibrium in the channel 28.

Specifically, a time period (hereinafter, referred to as "equilibrium arrival time") from a timing at which the material fluid and the extraction agent comes into contact with each other to a timing at which the extraction of the specific component from the material fluid reaches the extraction equilibrium is obtained in advance in accordance with simulations or tests. Also, a residence time period in which the extraction is performed by allowing the material fluid and the extraction agent being in contact with each other to flow in the channel 28 is set to be shorter than the obtained equilibrium arrival time. The residence time period corresponds to the time period required to allow the material fluid and the extraction agent to flow from the joining portion 31 to a downstream end of the extraction passage 32 in the channel 28, and further is proportional to a passage length of the extraction passage 32. Hence, the passage length which can realize a shorter residence time period than the equilibrium arrival time is obtained in advance. The first extraction unit 11 formed with the channels 28 each including the extraction passage 32 having the obtained passage length is used in an extracting system 1.

The mixture fluid having been flown out from each of the extraction passage 32 of the first extraction unit 11 into the outflow header 64 is separated into the material fluid and the extraction agent by a specific gravity difference in the outflow header 64. The material fluid having been separated is flown out from the outflow header 64 of the first extraction unit 11 and conveyed to a material inflow header 62 of a second extraction unit 12. Further, the extraction agent having been separated is flown out from the outflow header 64 of the first extraction unit 11 and conveyed to an extraction agent inflow header 63 of the second extraction unit 12.

A pH regulator supplied from a regulator supply tube 42 (see FIG. 1) is added to the material fluid being conveyed from the outflow header 64 of the first extraction unit 11 to the material inflow header 62 of the second extraction unit 12 to thereby regulate the pH of the material fluid being conveyed. Specifically, the pH of the material fluid is regulated to cause a reverse change from a change caused in the pH of the material fluid in accordance with the extraction of the specific component in the extraction passage 32 of the first extraction unit 11. In the extracting method of the present embodiment, the pH of the material fluid lowers due to the extraction of the specific component in each of the extraction passages 32. Hence, a basic liquid is adopted as the pH regulator to thereby raise the pH of the material fluid having lowered.

The material fluid conveyed to the material inflow header 62 of the second extraction unit 12 is dividedly introduced into the material introduction passages 29 in the channels 28 of the second extraction unit 12. The extract agent conveyed to the extraction inflow header 63 of the second extraction unit 12 is dividedly introduced into extraction introduction passages 30 in the channels 28 of the second extraction unit 12. The same process as that performed in the channels 28 of the first extraction unit 11 is performed in the channels 28 of the second extraction unit 12. Moreover, like the case of the first extraction unit 11, the mixture fluid of the material fluid and the extraction agent having been flown out from the extraction passages 32 of the second extraction unit 12 to the outflow header 64 is separated into the material fluid and the extraction agent in the outflow header 64. Furthermore, like the aforementioned manner, the pH regulator is added to the material fluid having been separated while the material fluid is conveyed to a material inflow header 62 of the third extraction unit 13 to thereby regulate the pH of the material fluid. Also, the extraction agent having been separated is conveyed to an extraction inflow header 63 of a third extraction unit 13.

The same process as those for the first extraction unit 11 and the second extraction unit 12 is performed in the channels 28 of the third extraction unit 13 through the material inflow header 62 and the extraction agent inflow header 63 thereof. Then, the mixture fluid of the material fluid and the extraction agent is frown out from an outflow header 64 of the third extraction unit 13 and introduced into a first settler 21 (see FIG. 1). The mixture fluid introduced into the first settler 21 is settled in the first settler 21 and separated into the material fluid and the extraction agent by a specific gravity difference therein. The material fluid and the extraction agent having been separated in the first settler 21 are independently flown out from the first settler 21.

The pH regulator is added to the material fluid frown out from the first settler 21 to regulate the pH of the material fluid, and the material fluid having the regulated pH is conveyed to a fourth extraction unit 14. Moreover, like the extraction agent supplied to the first extraction unit 11, an extraction agent unused for the extraction process is supplied to the fourth extraction unit 14. The material fluid and the extraction agent flow from the fourth extraction unit 14 and pass through a fifth extraction unit 15 to reach a sixth extraction unit 16. The process performed in the course is same as that performed in the course in which the material fluid and the extraction agent flow from the first extraction unit 11 and pass through the second extraction unit 12 to reach the third extraction unit 13.

The mixture fluid of the material fluid and the extraction agent having been flown out from the sixth extraction unit 16 is introduced into a second settler 22 and separated into the material fluid and the extraction agent therein, like the case of the first settler 21. The material fluid having been flown out from the second settler 22 is conveyed to a seventh extraction unit 17. Moreover, an extraction agent similar to that supplied to the first and fourth extraction units 11 and 14 is supplied to the seventh extraction unit 17. The material fluid and the extraction agent flow from the seventh extraction unit 17 and pass through an eight extraction unit 18 to reach a ninth extraction unit 19. The process performed in this course is same as that performed in the course in which the material fluid and the extraction agent flow from the fourth extraction unit 14 and pass through the fifth extraction unit 15 to reach the sixth extraction unit 16 except that no pH regulation is performed on the material fluid.

Subsequently, the mixture fluid of the material fluid and the extraction agent having been flown out from the ninth extraction unit 19 is introduced into a third settler 23 and separated into the material fluid and the extraction agent therein, like the cases of the first and second settlers 21 and 22. The material fluid having been separated in the third settler 23 is discharged from the third settler 23 to thereby become the final material fluid having undergone the extraction process.

The extracting method using the extracting system 1 according to the present embodiment is executed in the above-described manner.

In the extracting method according to the present embodiment, the mixture fluid of the material fluid and the extraction agent is flown out from each of the channels 28 of the first to ninth extraction unit 11 to 19 before the extraction of the specific component from the material fluid reaches the extraction equilibrium in the channel 28. Hence, there is no concern about time consumption after the extraction reaches the extraction equilibrium in which the extraction almost never progress in the extractions units 11 to 19.

Moreover, in the extracting method according to the present embodiment, the pH of the material fluid having been separated from the mixture fluid flown out from each of the channels 28 of the first to fifth extraction units 11 to 15 is regulated to cause a reverse change from a change due to the extracting step, before the material fluid is introduced into the channels 28 of the extraction unit for a succeeding stage. Therefore, it is possible to extract the specific component from the material fluid in the channel 28 of the extraction unit for the succeeding stage at the restored or approximately restored pH which assures a high extraction speed. In this way, the specific component is extracted from the material fluid at the high extraction speed in the channel 28 of the extraction unit for the succeeding stage.

Furthermore, in the extracting method according to the present embodiment, the extraction is performed by allowing the material fluid and the extraction agent to flow in the channels 28 of the first to ninth extraction unit 11 to 19. Accordingly, in comparison with use of a conventional mixer-setter unit including a mixer part where the material fluid and the extraction agent are agitated to perform the extraction, it is possible to shorten the time period required to separate the mixture fluid into the material fluid and the extraction agent in a separating step. From these perspectives, the extracting method according to the present embodiment can improve the time efficiency of the extraction process.

Additionally, in the conventional extracting process using a plurality of mixer-settler units, it may be appreciated to prevent a decrease in the extraction speed by directly adding a pH regulator in a mixer part or a settler part of the mixer-settler unit in each stage to thereby restore the pH which has lowered due to the extraction. However, in this case, there is a likelihood that the pH of the material fluid excessively rises in a region in the mixer part due to adding with the pH regulator, the region being a region where the extraction is less made, which results in deposition of a solid such as hydroxide in the material fluid. Also, because agitating operation is not performed in the settler part, there is a likelihood that the pH regulator is not fully mixed and thus unevenly stays at a particular location where the pH excessively rises, which results in precipitates in the material fluid, such as hydroxide. The precipitates will be likely to clog the tube or other parts.

In contrast, in the extracting method according to the present embodiment, the pH regulator is added to the material fluid having undergone the extracting step, and added to the material fluid being flowing and conveyed to the extraction unit for the succeeding stage. Hence, there is no concern about the above-described drastic rise in the pH of the material fluid. Accordingly, there is no risk of the clogging of the tube due to the deposition of the solid.

In the extracting method according to the present embodiment, the extraction agent having been separated after flown out from each of the channels 28 of the first, second, fourth, fifth, seventh, and eighth extraction units 11, 12, 14, 15, 17 and 18 is conveyed to the channels 28 of the extraction unit for the succeeding stage. In this manner, it is possible to gradually increase the density of the specific component contained in the extraction agent in accordance with the advance from these extraction units 11, 12, 14, 15, 17 and 18 to the extraction unit for the succeeding stage. Therefore, the specific component can be extracted from the material fluid with the use of a small amount of the extraction agent.

In the extracting method according to the present embodiment, another extraction agent, specifically a new extraction agent unused for the extraction process, is supplied to each of the channels 28 of the fourth and seventh extraction units 14 and 17, the another extraction agent accompanying the specific component in a lower rate than that having been separated in the outflow header 64 of the corresponding extraction unit or each of the settlers 21, 22 and 23. In this manner, it is possible to supply a fresh extraction agent having a high extraction capability to each of the channels 28 of the fourth and seventh extraction units 14 and 17. As a result, sufficient extraction can be performed in the channels 28 of the fourth and seventh extraction units 14 and 17 and the succeeding extraction units thereafter, even when the time period (residence time period) required to flow the material fluid and the extraction agent is shortened. Consequently, it is possible to further shorten the time period required for the extraction process in the entirety of the extracting system 1.

Furthermore, in the extracting method according to the present embodiment, used is the extracting system 1 having the configuration in which each of the extraction units 11 to 19 for the stages includes a plurality of channel plates 70 each in which a multiple of channels 28 in the form of microchannels are arrayed, the plurality of channel plates 70 being placed over one another. In each of the microchannels, a contacting area between the material fluid and the extracting agent per unit volume is large. Therefore, the extracting method according to the present embodiment makes it possible to extract the specific component from the material fluid in the extraction passage 32 in each of the channels 28 of the extraction units 11 to 19 at a much higher speed.

Also, each of the extraction units 11 to 19 has the multiple of the channels 28, and thus extraction process amount can be ensured. Further, in the channel 28 which is in the form of the microchannel, the material fluid and the extraction agent flow in a state that they are contacted with each other and easily separable from each other, for example, in the form of a slug flow. Hence, it is possible to shorten the time period required to separate the mixture fluid of the material fluid and the extraction agent having been flown out from the channel 28 into the material fluid and the extraction agent in the outflow header 64 or the settler 21, 22 or 23. In this way, it is possible to further improve the time efficiency of the extraction process.

First Example

As a first example, the result of the test performed to examine the effects by the extracting method of the present invention will be described.

In this test, a copper sulfate aqueous solution containing copper sulfate at the density of 0.01 mol/L was adopted as a material fluid. A di-2-ethylhexyl phosphoric acidic dodecane solution containing di-2-ethylhexyl phosphoric acid (D2EHPA) at the density of 2 mol/L was adopted as an extraction agent. The specific component as the target substance to be extracted was copper ion contained in the material fluid.

In the example as one example of the extracting method of the present invention, an extracting system including extraction units for three stages was used to extract the specific component from the material fluid to the extraction agent. An extraction passage in the form of a glass tube was adopted for each of the extraction units for the stages in order to facilitate the test. Specifically, a cylindrical tube made of glass and having an inner diameter of 2 mm was adopted, and the channel in the cylindrical tube defined the extraction passage. This cylindrical tube had an entrance for the material fluid and another entrance for the extraction agent independently, and was configured to allow the material fluid and the extraction agent independently introduced into the corresponding entrances to join each other and flow in the extraction passage in the cylindrical tube. Also, a separating part was provided at the end of the cylindrical tube that was opposite to the entrances in order to separate the mixture fluid of the material fluid and the extraction agent having passed through the extraction passage in the cylindrical tube into the material fluid and the extraction agent by the specific gravity difference.

The mixture fluid of the material fluid and the extraction agent having been flown out from the extraction passage in the cylindrical tube of the extraction unit for the first stage was separated into the material fluid and the extraction agent in the separating part. The extraction unit for the first stage and the extraction unit for the second stage were connected with each other in such a manner as to allow the material fluid having been separated to be conveyed to the entrance for the material fluid of the extraction unit for the second stage, and to allow the extraction agent having been separated to be conveyed to the entrance for the extraction agent of the extraction unit for the second stage. Also, the extraction unit for the second stage and the extraction unit for the third stage were connected with each other in the same connecting manner as the extraction unit for the first stage and the extraction unit for the second stage.

The material fluid and extraction agent having the same flow rate were supplied to the extraction unit for the first stage. Moreover, a pH regulator was added to the material fluid having been separated in the separating part after flown out from the extraction passage of the extraction unit for the first stage before the material fluid was flown into the extraction unit for the second stage to thereby regulate the pH of the material fluid. Similarly, the pH regulator was added to the material fluid having been separated in the separating step after flown out from the extraction passage of the extraction unit for the second stage before the material fluid was flown into the extraction unit for the third stage to thereby regulate the pH of the material fluid. An NaOH aqueous solution having 0.5 mol/L was adopted as the pH regulator.

Moreover, the density of the copper ion contained in the material fluid introduced into the extraction passage was measured at the entrance of the extraction passage of the extraction unit for each stage, and the density of the copper ion contained in the material fluid having been flown out from the extraction passage was measured at the exit of the extraction passage of the extraction unit for the stage. An extraction rate of the copper ion extracted from the material fluid in an extracting step performed in the extraction passage of the extraction unit for each stage was calculated from the difference between the density of the copper ion measured at the entrance and that measured at the exit of the extraction passage.

In a comparative example, an extracting system including only one extraction unit provided for a single stage was used to extract a specific component from a material fluid to an extraction agent. Like the example, a cylindrical tube made of glass and having an inner diameter of 2 mm was adopted for the extraction unit for the single stage as well, and the channel in the cylindrical tube defined an extraction passage. Like the example, the extraction unit in this comparative example also included an entrance for the material fluid and another entrance for the extraction agent. The extraction unit in this comparative example was configured to allow the material fluid and the extraction agent independently introduced into the corresponding entrances to be joined each other to flow in the extraction passage in the cylindrical tube. In this comparative example, four types of extraction units each including the cylindrical tube having a different length, i.e. the extraction passage having a different passage length, adapted to configure the corresponding extraction unit were prepared in order to collect data of various cases having different residence time periods of the fluid material and the extraction agent in the extraction passage. The same material fluid and extraction agent as those adopted in the example were adopted in this comparative example. Further, the material fluid and the extraction agent were supplied to the entrances of the extraction unit in this comparative example under the same conditions as those of the example where the material fluid and the extraction agent were supplied to the extraction unit for the first stage.

The density of the copper ion contained in the material fluid introduced into the extraction passage of the extraction unit was measured at the entrance of the extraction passage, and the density of the copper ion contained in the material fluid having been flown out was measured at the exit of the extraction passage of the extraction unit in the comparative example as well. Moreover, an extraction rate of the copper ion extracted from the material fluid in an extracting step performed in the extraction passage of the extraction unit was calculated in the same manner as the example.

Figure 4:
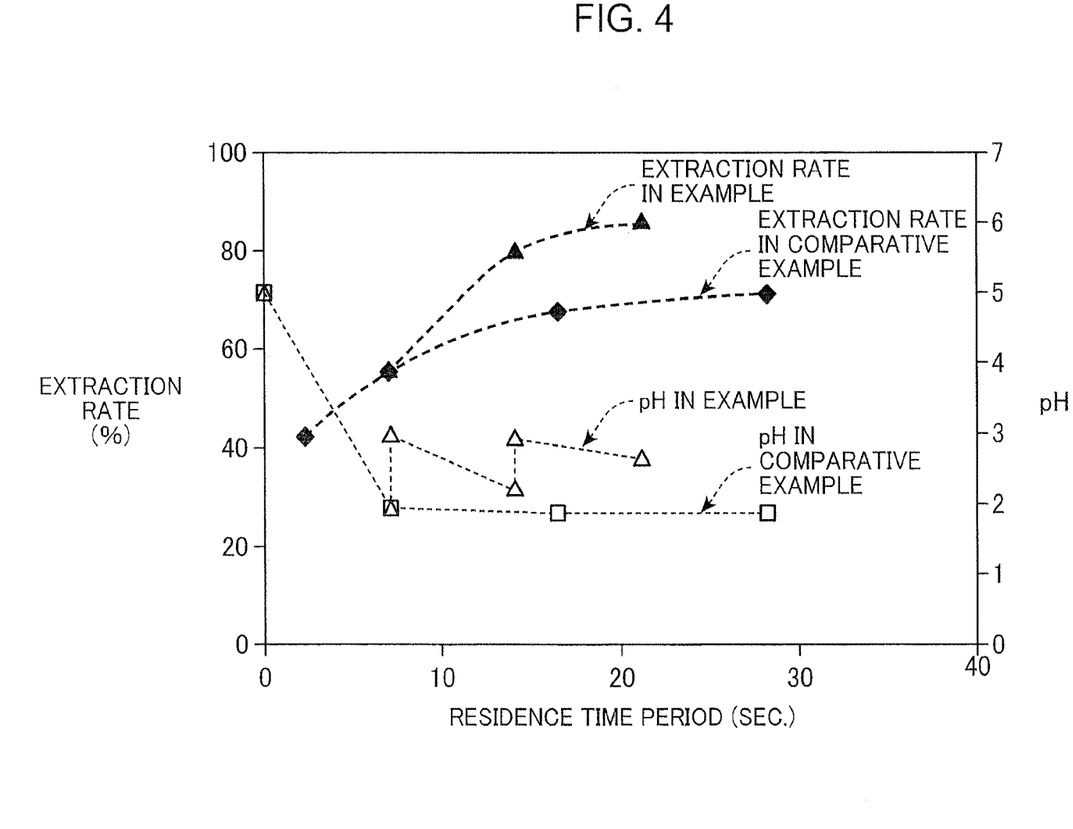
FIG. 4 is a graph showing a relationship among a residence time period of a material fluid and an extraction agent, an extraction rate, and the pH of the material fluid respectively obtained in a test of a first example.

FIG. 4 shows the results of the tests of the above-described example and the comparative example. In other words, FIG. 4 shows the relationship between the elapse of the residence time period in which the material fluid and the extraction agent being in contact with each other flowed, and the obtained extraction rate of the copper ion. FIG. 4 further shows the relationship between the elapse of the residence time period and the pH of the material fluid.

It is seen from FIG. 4 that, in the comparative example, the pH of the material fluid rapidly lowered for around 7 seconds of the residence time period of the material fluid and the extraction agent in the extraction passage. The pH lowered slightly thereafter. Particularly, when the residence time period exceeded around 17 seconds, the pH of the material fluid was kept mostly constant at the value having lowered. In the case of the comparative example, the extraction rate of the copper ion greatly increased to a certain extent until the residence time period of the material fluid and the extraction agent in the extraction passage reached around 7 seconds. After that, however, the extraction rate moderately increased, reached almost extraction equilibrium when the residence time period exceeded around 17 seconds, and merely increased slightly thereafter.

In contrast, in the example, the pH regulation was performed to the material fluid having been flown out respectively from the extraction units for the first and second stages, which restores the pH of the material fluid by the two stages. As a result, in the example, the extraction rate greatly increased during the time period even after the resident time period reached around 7 seconds where the extraction rate moderately increased in the comparative example. Thus, the extraction rate in the example was higher than that in the comparative example. The consequence can be seen that the extraction rate in the example of the present invention was higher than that in the comparative example when the extraction rates in the same residence time period were compared with each other. From another perspective, it is understood that, in the example of the present invention, a target extraction rate of the copper ion could be achieved in a shorter residence time period than that of the comparative example.

Second Example

Hereinafter, the results of the simulation executed to confirm the effects by the extracting method of the present invention over an extracting method using a conventional mixer-settler unit will be described.

In this simulation, a trivalent metal ion $M^{3+}$ was adopted as a specific component which is a target substance to be extracted, and a solution containing the metal ion $M^{3+}$ at the density of 0.5 mol/L was adopted as a material fluid. The material fluid had pH 2 in an unprocessed state.

Extraction reaction represented by the following reaction formula occurred in an extracting step. Indicated at HR in the reaction formula is a molecule of an extraction agent.

$$M^{3+}+3(HR) \rightarrow MR_3+3H^+$$

This reaction formula expresses generation of hydrogen ion ($H^+$) of 3 mol by extracting the metal ion ($M^{3+}$) of 1 mol from the material fluid. This means the lowering in the pH of the material fluid in accordance with extraction progress.

In this simulation, an index log D indicating the pH dependency of an extraction equilibrium for a metal ion extracted from the material fluid was set in accordance with the following equation. Indicated at D is a value obtainable by dividing the density of the metal ion $M^{3+}$ contained in the extraction agent at the extraction equilibrium time by the density of the metal ion $M^{3+}$ contained in the material fluid at the extraction equilibrium time.

$$\log D = 3 \text{ pH} - 0.5$$

In this simulation, an extraction speed coefficient K of the metal ion was set as an index which indicates the pH dependency of the extraction speed for the metal ion extracted from the material fluid in accordance with the following equation. The extraction speed coefficient K is a value to be set in accordance with each kind of the metal ion and the extraction agent.

$$K = 0.002[H^+]^{-1}$$

Indicated at [H$^+$] is the density of the hydrogen ion contained in the material fluid.

In the example, the extracting system 1 of the above-described embodiment was used to extract the metal ion $M^{3+}$ as the specific component from the material fluid. Moreover, in the example, an average residence time period in the extraction passage 32 of each of the extraction units 11 to 19 for respective stages was set to 64 seconds, and thus the total residence time period in the extraction passages 32 of the first to ninth extraction units 11 to 19 was set to 576 seconds. The average residence time period in the extraction passage 32 of each of the extraction units 11 to 19 for the stages was set to a time period which is shorter than the time period in which the extraction of the metal ion $M^{3+}$ as the specific component from the material fluid reached the extraction equilibrium. Moreover, a pH regulator was supplied from each regulator supply tube 42 to thereby regulate the pH of the corresponding material fluid to around 1 which is suitable for the extraction of the metal ion $M^{3+}$ and assures a high extraction speed.

In contrast, in a comparative example, an extracting system including mixer-settler units respectively provided for three stages was used to extract a specific component from a material fluid to an extraction agent. Each mixer-settler unit for the corresponding stage included a mixer part for agitating the material fluid and the extraction agent by an agitator to mix them, and a settler part for settling a mixture of the material fluid and the extraction agent having been mixed in the mixer part and separating the mixture into the material fluid and the extraction agent. The same material fluid, extraction agent, and specific component which is target substance to be extracted as those of the example were adopted in the comparative example.

An unprocessed material fluid was supplied to the mixer part of the mixer-settler unit for the first stage. Also, an extraction agent unused for the extraction process was supplied to each of the mixer parts of the mixer-settler units for the stages. The mixer-settler unit for the first stage was connected to the mixer-settler unit for the second stage in such a manner as to allow the material fluid having been separated in the settler part thereof to be conveyed to the mixer part of the mixer-settler unit for the second stage. The mixer-settler unit for the second stage was connected to the mixer settler unit for the third stage in such a manner as to allow the material fluid having been separated in the settler part thereof to be conveyed to the mixer part of the mixer-settler unit for the third stage.

Then, a pH regulator was added to the material fluid having been flown out from the settler part of the mixer-settler unit for the first stage before the material fluid was flown into the mixer part of the mixer-settler unit for the second stage to thereby regulate the pH of the material fluid to around 1. Similarly, the pH regulator was added to the material fluid having been flown out from the settler part of the mixer-settler unit for the second stage before the material fluid was flown into the mixer part of the mixer-settler unit for the third stage to thereby regulate the pH of the material fluid to around 1.

In the comparative example, a residence time period of the material fluid and the extraction agent in each mixer part of the mixer-settler unit for the corresponding stage was set to 289 seconds. Thus, the total residence time period in the mixer parts of the mixer settler units for the three stages indicated 867 seconds. The residence time period in the settler part was longer than the residence time period in the mixer part. Hence, the extraction of the specific component from the material fluid reached the extraction equilibrium during the residence in each of the settler parts.

Figure 5:
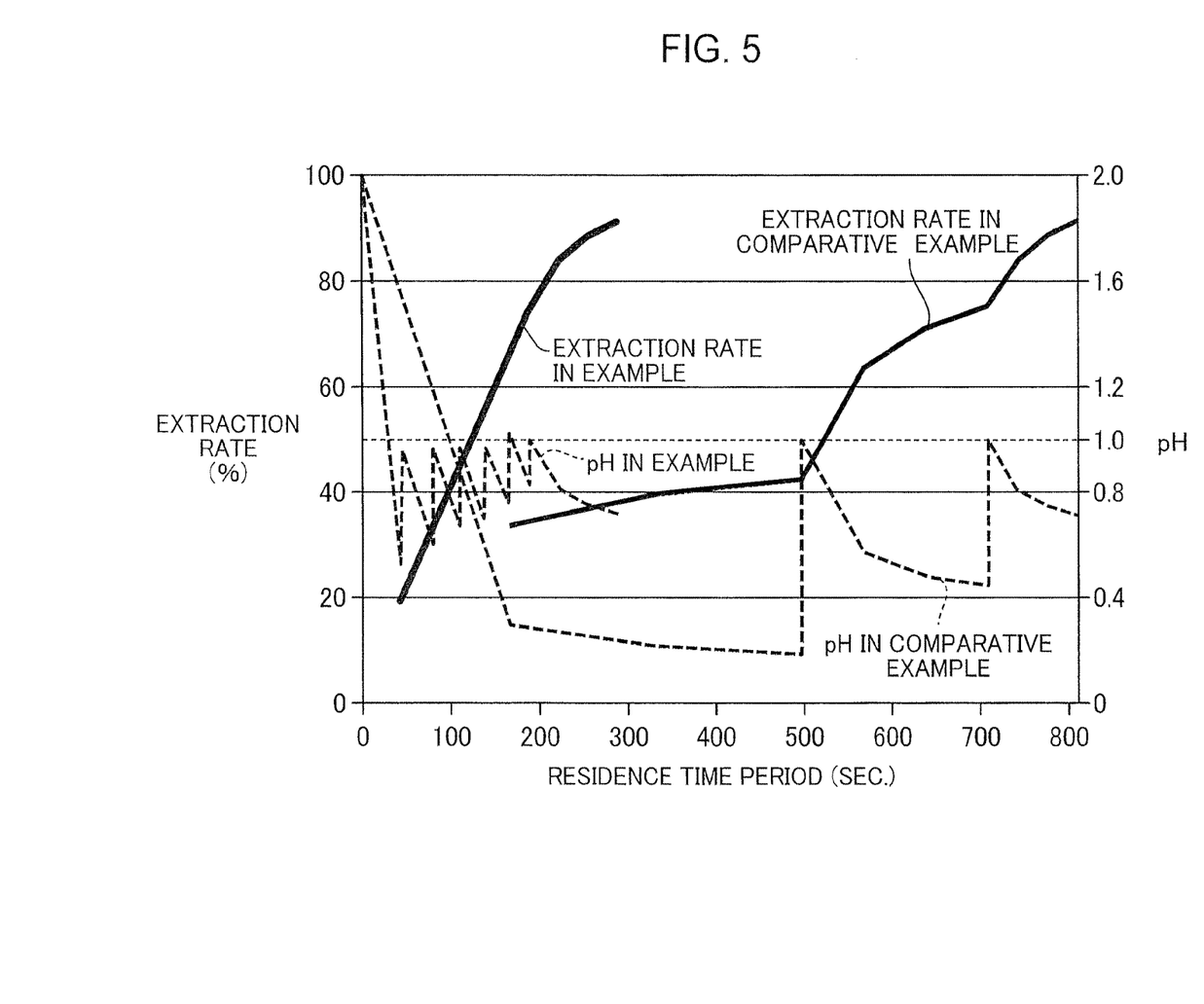
FIG. 5 is a graph showing a relationship among a residence time period of a material fluid and an extraction agent, an extraction rate, and the pH of the material fluid respectively obtained in a simulation of a second example.

The relationship among the residence time period in which the material fluid and the extraction agent were in contact with each other, the extraction rate, and the pH of the material fluid was obtained by the simulation based on the above-described example and the comparative example. FIG. 5 shows the results of the simulation.

It is seen from FIG. 5 that the residence time period of around 800 seconds was required to reach around 90% of the extraction rate in the comparative example. In contrast, the residence time period of around 280 seconds was sufficient to reach the same extraction rate in the example. It should be noted that the residence time period in each of the settler parts of the mixer-settler units for the stages was excluded in the comparative example in the simulation. Hence, actually, a much longer residence time period will be required in the comparative example. It is understood from this perspective that the extracting method according to the example makes it possible to remarkably shorten the time period until the extraction rate reaches a predetermined extraction rate (i.e. target extraction rate) in comparison with the extraction method using the conventional mixer-settler units.

The disclosed embodiments and examples merely show examples in all the aspects, and thus should not be considered to be limited. The scope of the present invention should be defined by the scope of claims, not the description of the above-described embodiments, and further cover meanings equivalent to those readable in the scope of claims and all the changes falling within the scope of the claims.

Figure 6:
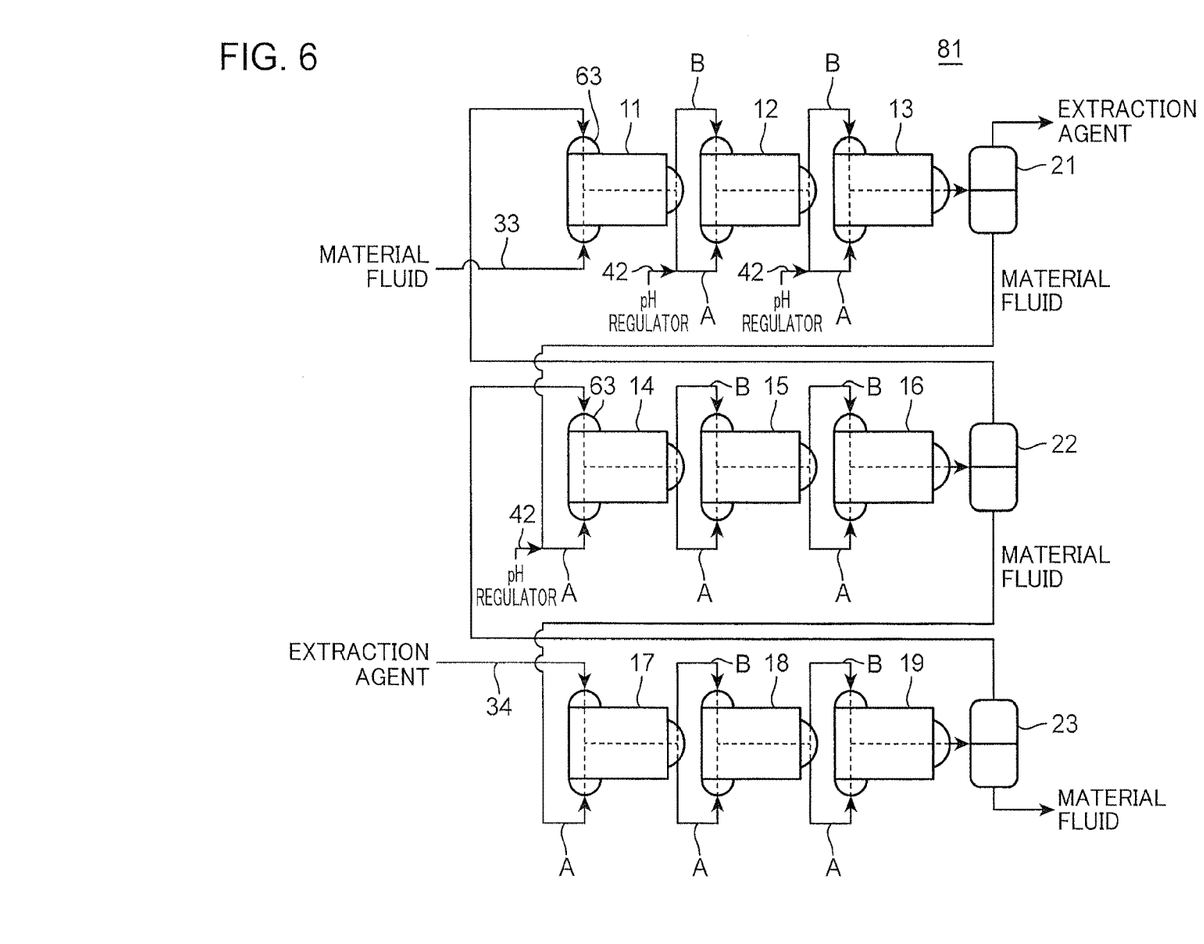
FIG. 6 is a schematic view showing a configuration of a first modified extracting system according to the present invention.

For example, like a first modification shown in FIG. 6, it may be appreciated to perform an extracting process of extracting a specific component from a material fluid by using an extraction system 81 structured to convey an extraction agent having been separated in an intermediate settler to an extraction unit located at an upstream side of the intermediate settler.

Specifically, in the extracting system 81 according to the first modification, a second settler 22 and an extraction agent inflow header 63 of a first extraction unit 11 are connected with each other in such a manner as to allow the extraction agent having been separated in the second settler 22 to be conveyed to channels 28 (see FIG. 3) of the first extraction unit 11. Similarly, a third settler 23 and an extraction inflow header 63 of a fourth extraction unit 14 are connected with each other in such a manner as to allow the extraction agent having been separated in the third settler 23 to be conveyed to channels 28 (see FIG. 3) of the fourth extraction unit 14.

In the extracting system 81 according to the first modification, an extraction agent unused for the extraction process is supplied only to channels 28 (see FIG. 3) of a seventh extraction unit 17. A pH regulator is added only to the material fluid being conveyed from the first extraction unit 11 to the second extraction unit 12, the material fluid being conveyed from the second extraction unit 12 to the third extraction unit 13, and the material fluid being conveyed from the first settler 21 to the fourth extraction unit 14.

The extracting system 81 according to the first modification has the same configuration as the extracting system 1 according to the embodiment except for the aforementioned structure.

In the extracting method using the extracting system 81 according to the first modification, the extraction agent having been separated in the second settler 22 can be reused for the extraction of the specific component from the material fluid in the first extraction unit 11 located at the upstream side of the second settler 22. Also, the extraction agent having been separated in the third settler 23 can be reused for the extraction of the specific component from the material fluid in the fourth extraction unit 14 located at an upstream side of the third settler 23. Accordingly, it is possible to further reduce the amount of the extraction agent to be used.

Figure 7:
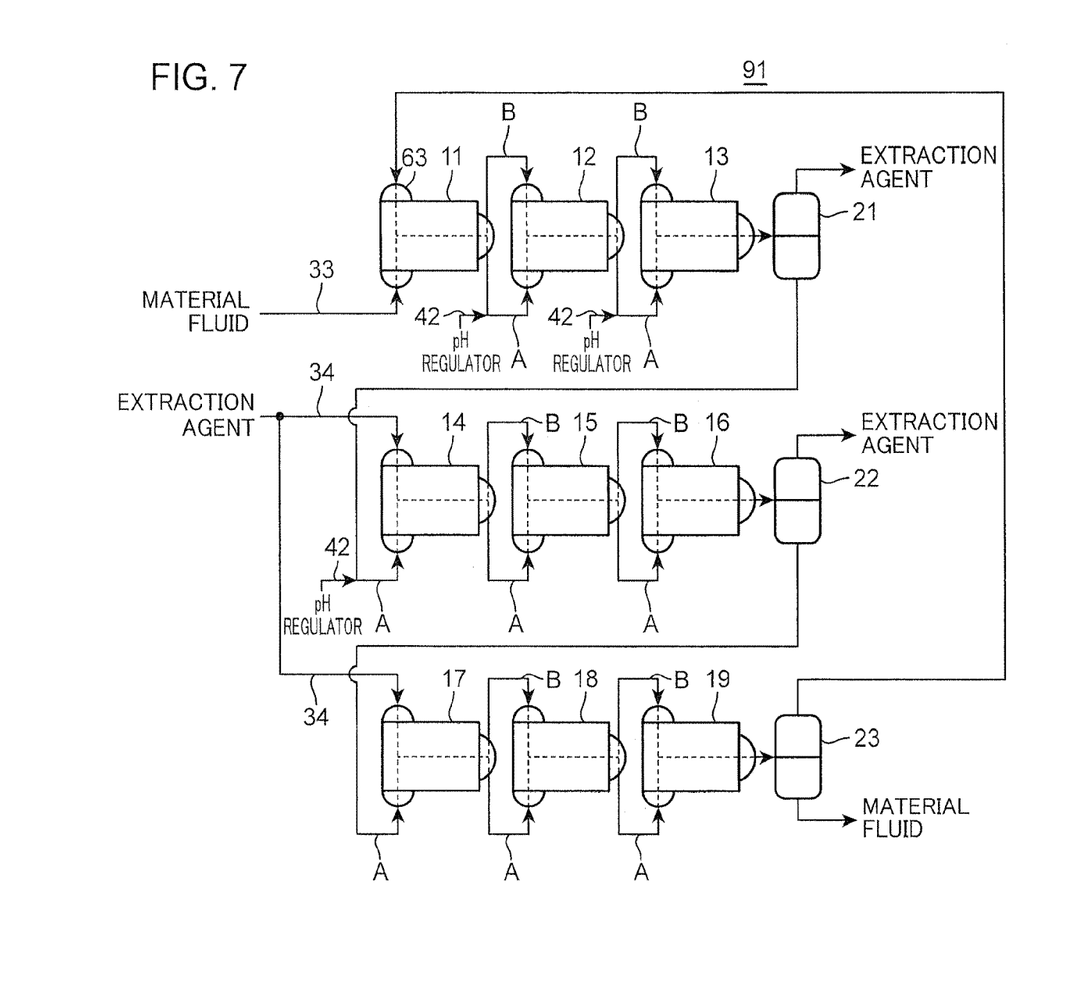
FIG. 7 is a schematic view showing a configuration of a second modified extracting system according to the present invention.

Furthermore, like a second modification shown in FIG. 7, it may be appreciated to perform an extraction process of extracting a specific component from a material fluid by using an extracting system 91 structured to convey an extraction agent having been separated in the lowermost stream settler to the uppermost stream extraction unit.

Specifically, in the extracting system according to the second modification, a third settler 23 and an extraction agent inflow header 63 of a first extraction unit 11 are connected with each other in such a manner as to allow an extraction agent having been separated in the third settler 23 to be conveyed to channels 28 (see FIG. 3) of the first extraction unit 11. Also, in the extracting system 91 according to the second modification, an extraction agent unused for the extraction process is supplied only to channels 28 (see FIG. 3) of a fourth extraction unit 14 and channels 28 (see FIG. 3) of a seventh extraction unit 17. Further, the same way of supplying the pH regulator as that of the first modification is adopted in the second modification.

The extracting system 91 according to the second modification has the same configuration as the extracting system 1 according to the embodiment except for the aforementioned structure.

In the extracting method using the extracting system 91 according to the second modification, the extraction agent having been separated in the third settler 23 can be reused for the extraction of the specific component from the material fluid in the first extraction unit 11 located at the uppermost stream side. Accordingly, it is possible to reduce the amount of the extraction agent to be used in the second modification as well.

The above-described embodiment shows the example of the extraction unit body configured by the lamination including the plurality of channel plates each formed with the multiple of channels in the form of microchannels, and the plurality of sealing plates, the channel plates and sealing plates being alternately placed over one another. However, the configuration is not necessarily limited thereto. For example, an extraction unit having an extraction passage in the form of a tube made of glass as adopted in the first example may be adopted.

Moreover, the applicability of the present invention is not limited to the form in which the pH of the material fluid lowers in accordance with the extraction of the specific component from the material fluid. For example, the present invention is applicable to the form in which the pH of the material fluid rises in accordance with the extraction of the specific component from the material fluid.

Summary of Embodiments

The embodiments will be summarized in the below-described manner.

An extracting method according to the embodiment is a method for extracting a specific component from a material fluid to an extraction agent by using an extracting system which includes a plurality of extraction units respectively provided for a plurality of stages, the extraction units each having a channel adapted for extraction and being connected with one another to allow at least a part of the fluid having been flown out from the channel of one of the plurality of the extraction units for any one stage of the plurality of stages to be conveyed to the channel of one of the plurality of the extraction units for a stage succeeding to the any one stage, the extracting method comprising: an extracting step of extracting the specific component from the material fluid to the extraction agent while allowing the material fluid and the extraction agent to flow in the channel of the extraction unit for each of the stages; an outflowing step of outflowing the mixture fluid containing the material fluid and the extraction agent from the channel of the extraction unit for each of the stages before the extraction of the specific component from the material fluid reaches an extraction equilibrium in the channel of the extraction unit for each of the stages; a separating step of separating the mixture fluid having been flown out from the channel of the extraction unit for each of the stages into the material fluid and the extraction agent; a material fluid conveying step of conveying the material fluid having been separated in the separating step after flown out from the channel of one of the plurality of the extraction units for any one stage of the plurality of stages to the channel of one of the extraction units for the stage succeeding to the any one stage; and a pH regulating step of regulating the pH of the material fluid having been separated in the separating step after flown out from the channel of the extraction unit for a predetermined stage so as to cause a reverse change from a change caused in the pH of the material fluid in accordance with the extraction of the specific component in the extracting step, before the material fluid is introduced into the channel of the extraction unit for a stage succeeding to the predetermined stage.

In the extracting method, the mixture fluid of the material fluid and the extraction agent is flown out from the channel of the extraction unit for each of the stages before the extraction of the specific component reaches the extraction equilibrium in the channel, and the material fluid in the mixture fluid having been flown out is conveyed to the channel of the extraction unit for the succeeding stage. Hence, there is no concern about time consumption after the extraction reaches the extraction equilibrium in which the extraction progress is extremely slow in the extraction unit for each stage. Moreover, in the extracting method, the pH of the material fluid having been separated from the mixture fluid after flown out from the channel of the extraction unit for a predetermined stage is regulated to cause a reverse change from a change caused in the pH of the material fluid due to the extracting step, before the material fluid was introduced into the channel of the extraction unit for a stage succeeding to the predetermined stage. Therefore, in the channel of the extraction unit for the stage succeeding to the predetermined stage, it is possible to extract the specific component from the material fluid having the restored pH condition assuring a high extraction speed. In this manner, the extraction of the specific component from the material fluid is performed at the high extraction speed in the channel of the extraction unit for the stage succeeding to the predetermined stage. Additionally, in the extracting method, the extraction is performed by allowing the material fluid and the extraction agent to flow in the channel of the extraction unit for each of the stages. Accordingly, in comparison with use of a conventional mixer-setter unit including a mixer part where the material fluid and the extraction agent are agitated for the extraction, it is possible to shorten the time period required to separate the mixture fluid into the material fluid and the extraction agent in the separating step. From these perspectives, the extracting method can improve the time efficiency of the extraction process.

The extracting method preferably further includes: an extraction agent conveying step of conveying the extraction agent having been separated in the separating step after flown out from the channel of the extraction unit for a certain stage to the channel of the extraction unit for a stage succeeding to the certain stage.

This configuration makes it possible to extract the specific component from the material fluid with use of a small amount of the extraction agent.

The extracting method preferably further includes: an extraction agent supplying step of supplying another extraction agent to the channel of the extraction unit for a certain stage, the another extraction agent having a content rate of the specific component lower than that in the extraction agent having been separated in the separating step.

This configuration makes it possible to supply a fresh extraction agent having the high extraction capability to the channel of the extraction unit for the certain stage. Hence, sufficient extraction can be performed in the channel of the extraction unit for the certain stage, even when the time period (residence time period) required to flow the material fluid and the extraction unit is shortened. Consequently, it is possible to further shorten the time period required for the extraction process.

In the extracting method, it is preferable that the pH regulating step is performed to each material fluid having been separated after flown out from the channels of the extraction units for the plurality of stages.

This configuration includes the plurality of extraction units adoptable to extract the specific component from the material fluid having the restored pH condition assuring a high extraction speed. In this manner, it is possible to further improve the time efficiency of the extraction process.

In the extracting method, it is preferable that the extracting system includes an extraction unit for each of the stages including a structure which has a plurality of channel layers each having a plurality of microchannels as the channel and in which the plurality of channel layers are placed over one another, the plurality of microchannels being arrayed in the channel layer.

In each of the macrochannels, a contacting area between the material fluid and the extracting agent per unit volume is large. Therefore, in this configuration, it is possible to extract the specific component from the material fluid in the microchannel of the extraction unit for each stage at a high extraction speed. Moreover, the extraction unit for each stage has the multiple of the microchannels, and thus extraction process amount can be ensured. Furthermore, unlike an extracting step of agitating type, the material fluid and the extraction agent do not excessively form into micro particles in the extracting step in which the material fluid and the extraction agent flow in the microchannel. Therefore, it is possible to further shorten the time period required to separate the mixture fluid of the material fluid and the extraction agent into the material fluid and the extraction agent in the separating step after the mixture fluid is flown out. In this manner, it is possible to further improve the time efficiency of the extraction process.

As described above, the extracting method according to the embodiments can improve the time efficiency of the extraction process.

The invention claimed is:

1. An extracting method, comprising:
(I) extracting a specific component from a material fluid to an extraction agent by using an extracting system, which comprises a plurality of extraction units, wherein each extraction unit has a channel configured for extraction and connected with one another to allow the material fluid and the extraction agent to flow in the channel of each extraction unit;

(II) outflowing a mixture fluid containing the material fluid and the extraction agent from the channel of each extraction unit before extraction of the specific component from the material fluid reaches an extraction equilibrium in the channel of each extraction unit;

(III) separating the mixture fluid flown out of the channel of each extraction unit into the material fluid and the extraction agent;

(IV) conveying the material fluid separated in said separating (III) after flowing out of the channel of any one extraction unit to the channel of a subsequent extraction unit;

(V) regulating pH of the material fluid separated in said separating (III) after flowing out of the channel of a predetermined extraction unit so as to cause a reverse change from a change caused in the pH of the material fluid in accordance with the extraction of the specific component in said extracting before introducing the material fluid into the channel of a succeeding extraction unit;

(VI) conveying the extraction agent separated in said separating (III) after flowing out of the channel of any one extraction unit to the channel of a subsequent extraction unit; and (VII) supplying another extraction agent to the channel of a certain extraction unit different from the subsequent extraction unit in said conveying (VI), wherein the another extraction agent is separately added to the extracting system and has a content of the specific component lower than that in the extraction agent separated in said separating (III).

2. The extracting method according to claim 1, wherein, said regulating (V) is performed on each material fluid separated after flowing out of the channel of each extraction unit.

3. The extracting method according to claim 1, wherein, each extraction unit comprises a structure comprising a plurality of channel layers, each channel layer comprises a plurality of microchannels as the channel, the plurality of channel layers are placed over one another in the structure, and the plurality of microchannels are arrayed in each channel layer.

4. The extracting method according to claim 3, wherein the plurality of microchannels include material introduction passages, extraction agent introduction passages, joining portions, and extraction passages.

5. The extracting method according to claim 4, wherein each extraction unit comprises a material inflow header formed with openings of upstream ends of the material introductions passages, an extraction agent inflow header formed with openings of upstream ends of the extraction agent introduction passages, and an outflow header formed with openings of downstream ends of the extraction passages, where an upstream end and an downstream end refer to an end located on an upstream side and a downstream side in a flow direction of the material fluid, respectively.

* * * * *